UNITED STATES PATENT OFFICE.

HENRY J. RHODES, OF ROCHESTER, NEW YORK.

FOOD COMPOUND.

1,252,029.     Specification of Letters Patent.     Patented Jan. 1, 1918.

No Drawing.     Application filed September 7, 1917. Serial No. 190,127.

*To all whom it may concern:*

Be it known that I, HENRY J. RHODES, a subject of the King of Great Britain, residing at Rochester, in the county of Monroe and State of New York, have invented certain new and useful Improvements in Food Compounds, of which the following is a specification.

This invention relates to food compounds and has for its object the production of such a compound which will be palatable, wholesome, easy to make, will keep well and will not require cooking before serving.

Another object of the invention is to provide a food that will be of small weight and bulk which will, nevertheless, serve as a complete balanced ration that can be used without other food for a considerable number of days.

These and other objects of the food will be fully described in the specification and pointed out in the claims at the end thereof.

The composition and formula and food values of the ingredients of this food may be stated as follows:

|  | Weight. | Calories. | | | |
| --- | --- | --- | --- | --- | --- |
|  |  | Proteins. | Fats. | Carbohydrates. | Total. |
| Beefsteak (lean and uncooked) | 32 ozs. | 1,308.8 | 145.28 | 0 | 1,454.08 |
| Butter | 12 ozs. | 14.4 | 2,719.2 | 0 | 2,733.6 |
| Eggs (hard boiled, ground, and evaporated) | 10 ozs. | 163.0 | 320.0 | 0 | 483.0 |
| Peanuts (raw or roasted, then ground) | 4 ozs. | 120.4 | 411.6 | 34.0 | 566.0 |
| Dates (without stones) | 16 ozs. | 40.0 | 120.0 | 1,464.0 | 1,624.0 |
| Figs (ground) | 16 ozs. | 8.0 | 128.0 | 1,385.6 | 1,521.6 |
| Raisins (seeded) | 16 ozs. | 48.0 | 140.8 | 1,420.8 | 1,609.6 |
| Cocoa (powdered) | 4 ozs. | 100.8 | 308.4 | 176.0 | 585.2 |
| Wheat grits (meal) | 16 ozs. | 196.8 | 84.8 | 1,419.2 | 1,700.8 |
| Oat meal | 16 ozs. | 300.8 | 307.2 | 1,260.8 | 1,868.8 |
| Barley flour | 12 ozs. | 118.8 | 34.8 | 1,089.6 | 1,243.2 |
| Pea (pease) flour | 4 ozs. | 114.8 | 10.8 | 289.2 | 414.8 |
| Candied peel (mixed) | 12 ozs. |  |  |  |  |
| Sugar (granulated) | 16 ozs. | 0 | 0 | 1,865.6 | 1,865.6 |
| Salt powder | 2 ozs. |  |  |  |  |
| Pepper | ½ tea-spoon each. |  |  |  |  |
| Cinnamon |  |  |  |  |  |
| Ginger |  |  |  |  |  |
| Nutmeg |  |  |  |  |  |
|  |  | 2,534.6 | 4,730.88 | 10,404.8 | 17,670.28 |

This quantity will be a sufficient ration for eight days and a daily ration thereof will have the following calories:

Proteins                 316.8.
    Fats                       582.2.
    Carbohydrates        1300.6.

The thirty-two ounces of beefsteak is ground fine and three ounces of butter is then mixed with it and it is then heated about twenty minutes at a temperature a little below boiling point, it being stirred to secure even heating and evaporation of water, at the end of which time it is reduced to a mass of fine granules having the appearance of sand or sugar.

The eggs are placed in cold water which is gradually raised to boiling point, which temperature is kept for about ten minutes and then ten ounces of the eggs are ground and one ounce of butter is mixed with them and the mass is then heated until about fifty per cent. of the water is evaporated by which treatment the eggs are reduced to granules.

The four ounces of roasted peanuts or their equivalent of raw peanuts are ground. The stones are removed from the dates, the stems from the figs and the seeds from the raisins and these three elements together with the candied peel in the proper amount are all ground together.

The cereals which include the wheat grits, oatmeal, barley flour and pea flour are mixed with the peanuts, cocoa, salt, pepper, cinnamon, ginger and nutmeg. All of these are in a powdered condition and are evenly mixed.

The beefsteak and eggs granules are then stirred in with the cereals after which the dates, figs and raisins and candied peel thoroughly ground up and the balance of the butter are stirred in.

The sugar is added last. It is first boiled with water until it reaches the point known as snap, in which a drop of it emersed in cold water will quickly harden and crystallize. When the sugar is in this condition the mixture of all the above ingredients is added to the sugar and vigorously stirred into it, during which operation the sugar will be absorbed by the other ingredients and the complete food will be produced which in its finished form will be a rather stiff paste.

The finished product is molded into suitable cakes or blocks and covered with a palatable or even nutritious coating, such as chocolate, rice wafer, etc.

I claim:

1. A food compound comprising meat and eggs ground fine and heated with butter to make fine granules and then mixed without further cooking with ground cereals, fruit, nuts and spices.

2. A food compound comprising meat and eggs ground fine and heated with butter to make fine granules and then mixed without further cooking with ground peanuts, wheat, oatmeal, barley flour, pea flour, cocoa, dates, figs, raisins, hot saturated solution of sugar and spices.

In testimony whereof I affix my signature in the presence of a witness.

HENRY J. RHODES.

Witness:
ELEANOR M. CORCORAN.